US008342940B2

(12) United States Patent
Dorr

(10) Patent No.: US 8,342,940 B2
(45) Date of Patent: Jan. 1, 2013

(54) GAMING MACHINE FOR ONE WAGERED-ON GAME SYMBOL HAVING EXTENDED PLAY AND METHOD

(76) Inventor: Robert C. Dorr, Colorado City, CO (US)

( * ) Notice: Subject to any disclaimer, the term of this patent is extended or adjusted under 35 U.S.C. 154(b) by 0 days.

(21) Appl. No.: 13/445,059

(22) Filed: Apr. 12, 2012

(65) Prior Publication Data

US 2012/0282993 A1 Nov. 8, 2012

Related U.S. Application Data

(63) Continuation-in-part of application No. 13/101,448, filed on May 5, 2011, now Pat. No. 8,221,219.

(51) Int. Cl.
*A63F 9/00* (2006.01)
*A63F 13/00* (2006.01)

(52) U.S. Cl. ........................................... 463/20; 463/16

(58) Field of Classification Search ............... 463/16–20
See application file for complete search history.

(56) References Cited

U.S. PATENT DOCUMENTS

| | | | | |
|---|---|---|---|---|
| 6,550,772 | B1 | 4/2003 | Streeks et al. | |
| 6,592,457 | B1 | 7/2003 | Frohm et al. | |
| 6,902,478 | B2 | 6/2005 | McClintic | |
| 6,991,539 | B2 | 1/2006 | Pacey | |
| 8,147,322 | B2 * | 4/2012 | Walker et al. | 463/25 |
| 2003/0069057 | A1 | 4/2003 | DeFrees-Parrott | |
| 2006/0258431 | A1 | 11/2006 | Kobayashi | |

* cited by examiner

*Primary Examiner* — William Brewster
*Assistant Examiner* — Jason Skaarup

(57) ABSTRACT

A base game in a gaming machine that plays only one game symbol in a display in response to a wager. The wagered-on game symbol is transformed to reveal a random game play result picked by a processor from a number of symbol types. One type is a player action type symbol that can statistically extend base game play through player input in further rounds of base game play. As further rounds of extended base game play occur, the expected player payoff grows in value. Base game play ends whenever an award symbol type (value or null) is displayed.

17 Claims, 8 Drawing Sheets

GAMING MACHINE FOR ONE WAGERED-ON GAME SYMBOL HAVING EXTENDED PLAY AND METHOD

RELATED APPLICATION DATA AND PRIORITY CLAIM

This continuation-in-part application claims priority to "Gaming Machine Displaying One Wagered-on Game Symbol and Method of Play," Ser. No. 13/101,448 filed May 5, 2011 and this application is incorporated by reference in its entirety into the present application

COPYRIGHT NOTICE

A portion of the disclosure of this patent document contains or may contain material subject to copyright protection. The copyright owner has no objection to the reproduction of the patent document or the patent disclosure in exactly the form it appears in the Patent and Trademark Office patent file or records, but otherwise reserves all copyright rights.

FIELD OF THE INVENTION

The invention relates to gaming machines and methods and, more particularly, to gaming machines and methods with extended base game play.

BACKGROUND OF THE INVENTION

Prior gaming machines such as multi-reel and multi-line slot machines have a number of displayed game symbols. U.S. Pat. No. 8,147,322 (Walker Digital, LLC) states that "the term 'symbol' may refer to any graphic or other indicia that appear on the reels of a gaming device, or in any game area of a gaming device, or on the display of another device that may represent an outcome or a portion thereof." By way of historical example, a slot machine had three mechanical reels of game symbols that, when a wager was inserted and played, would mechanically rotate and randomly align game symbols on a pay line to award the player when a winning combination of game symbols occurs. Today, a large number of electronic gaming machines, under control of a processor, exist that often provide a base game having more than three reels and a large number of pay lines such as five reels with numerous game symbols with 25 or more pay lines. Such multi-reel, multi-pay line electronic gaming machines, however, are often difficult for players to understand the many different game symbols and winning game symbol combinations on such numerous pay lines. Rather than trying to understand, some players simply wager and wait for the casino base game to visually and/or audibly highlight any winning combinations on each of the numerous pay lines. This is often confusing to players and such confusion is not present in the older style three reels, one pay line slot machines. A need exists to provide more electronic gaming machines having game play simplicity so players can fully understand base game play and know how and why a win occurs.

Such multi-reel, multi-pay line electronic gaming machines often provide a complicated wagering pattern such as wagering one (or multiple) bet(s) on one (or multiple) pay line(s). More importantly, when a player wagers one bet on one line and receives a winning combination of symbols on another line, the player may be disappointed. When the player wagers a "max bet" by wagering the maximum bet allowed per line on each pay line, the player may be surprised and upset as the max bet wager may be a large amount. Games in gaming machines are also implemented in remote locations such as over the Internet in player computers or other appliances. In these remote environments, the player has the audio visual look and feel of playing the gaming machine. Many such implementations use play money (or the like) for wagering. Whether real or play money is wagered, game play is the same. A need exists to provide simplistic game play and wagering patterns without using numerous reels and pay lines to players to avoid such disappointments and surprises. Such simplicity game play and wagering may also attract players such as elderly players who otherwise may become confused as to how much is wagered and/or what winning outcomes are. Likewise, such simplistic games may appeal to the elderly in who do not have access to casinos, but enjoy wagering play money.

Casino operators generally seek gaming machines that quickly complete play of the base game so as to increase overall profits for the footprint the gaming machine occupies. A further need exists to provide a base game offering fast play.

Casino operators generally seek gaming machines that keep players seated for continued play of the base game with an exciting game theme and/or with bonus games played when a bonusing event or trigger occurs in base game play. Conventional games may also use interactive features where the player touches displayed objects on a touch screen to reveal hidden awards. Such conventional games may also use extended base game play to encourage the player to continually re-wager. A need also exists to provide a casino base game that encourages players to continue play at the gaming machine based on placing only the initial wager.

Some prior gaming machine designs incorporate graphic scene or story lines in bonus game play such as providing a bonus game having a predetermined number of successive free spins. The player receives credits for any win during each free spin while viewing a video scene. In another design, a player selects a character from a list and then places a wager in the base game. When a bonus game is triggered during base game play; the player may make modifications to the selected character's attributes and may optionally surrender or challenge an opponent (another player or the computer) such as in a fight scene in the bonus screen. Bonus games that are statistically triggered after a number of base games are played.

Several prior gaming machine designs also incorporate graphic stories or story lines in base game play such as presenting to a player a matrix of game symbols. The player wagers and then successively selects, one by one, a predetermined number of a larger number of the displayed game symbols in the matrix. In play of the base game, a fight scene in stages in a game display and the player controls the action of one fighter in each stage with the selection of each game symbol. The base game continues until all of the predetermined number of game symbols is selected by the player and the final payoff is then made. Each game symbol selection results in a stage of the fight displayed in the screen and the player collects a payoff (either a null value or a value) in each stage until the game ends at the last selection. Another design sets forth a base game wherein a player clicks on one object from many objects displayed on a screen and places a wager. The selected object reveals a random payoff, a transition to a new scene, etc. The process of clicking and placing a new wager continues to further play each scene of the base game. In another design, the player interacts with a story line to make decisions on how the story continues in scenes from beginning to end of play. In each scene of the story, the player may accumulate awards. A further need exists to design a base game that statistically provides extended play through a number of rounds based only on the initial wager, but ends base game play whenever an award (a value award or a null award) is made in a round. A final need exists to statistically increase the expected player payoff as more rounds of the base game are played.

SUMMARY OF THE INVENTION

The invention addresses the aforesaid needs by providing gaming machines and methods of game play and extended game play that use only one game symbol in a display which is wagered-on by a player to reveal only one game play result thereby providing: game simplicity, uncomplicated wagering, fast game play, and game excitement—all without reels containing many game symbols and without numerous pay lines that require a number of different winning combinations of game symbols to provide awards to the player.

The wagering base game of the invention is controlled by a processor in a gaming machine to provide only one game symbol in a display to a wager on. The processor detects the wager and transforms the wagered-on only one game symbol to reveal a random game play result in the display. The revealed game play result corresponds to a random one of a number of different symbol types for the wagered-on only one game symbol. The processor ends the base game whenever the revealed game play result provides an award symbol type.

The method of the invention provides a base game in a gaming machine where only one game symbol is displayed. In response to a wager, the game symbol is transformed to reveal a random game play result picked by a processor from a number of symbol types. One symbol type is a player action type symbol that can statistically extends base game play through subsequent player inputs in further rounds of base game play. As further rounds of extended base game play occur, the expected player payoff can grow in value. Base game play ends whenever an award symbol type (value or null) is displayed.

The base game method of the invention is functionally implemented in a number of processor environments such as: a processor; a display connected to the processor; a wager detector connected to the processor; a wagering base game controlled by the processor using only one game symbol on the display for game play; the only one wagered-on game symbol being transformed by the processor over a period of time on the display during game play to reveal a random game play result; a credit meter connected to the processor; and the processor incrementing the credit meter when the revealed random game play result provides an award.

The summary set forth above does not limit the teachings of the invention especially as to variations and other embodiments of the invention as more fully set out in the following description taken in connection with the accompanying drawings, which illustrate by way of example, various embodiments of the invention.

DETAILED DESCRIPTION OF THE INVENTION

Figure 1:
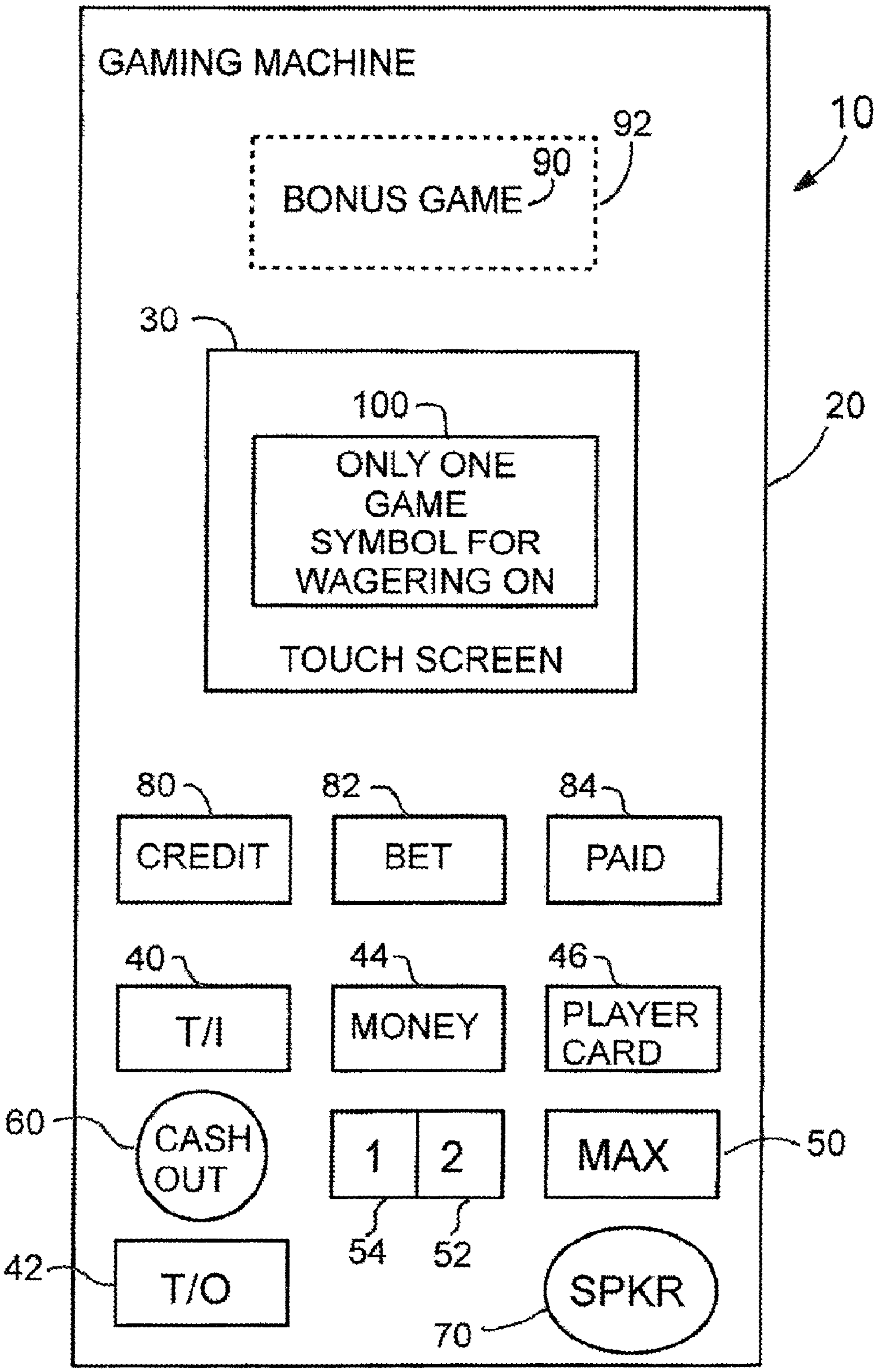
FIG. 1 is an illustration showing an electronic gaming machine of the invention and its various input/output devices.

The player operated gaming machine 10 of the invention is shown in one embodiment in FIG. 1 having a cabinet 20, a touch display 30, a cashless ticket input 40 (T/I), a cashless ticket output 42 (T/O), a currency input 44 (MONEY), and a player card input 46. The machine 10 also has a “max bet” button 50; individual bet buttons such the “bet 2” and “bet 1” buttons 52 and 54; and cash out button 60. A speaker(s) 70 is provided in the cabinet 20. Credit, bet, and paid displays 80, 82, and 84 are also provided separately as shown or may be incorporated into display 30. An optional bonus game 90 with a display 92 may also be provided. In FIG. 1, the cabinet 20 can be upright or slanted so that a player can be seated to play the game (not shown). All of the above components are conventional to casino game machines and the use and operation of each component individually and together are well known. The various components shown are just one embodiment and many conventional design variations are available including those implemented over networks such as the Internet using play or other forms of money. The casino gaming machine 10 of the invention uses only one game symbol 100 that a player wagers on in the base game for game play and extended game as will be explained subsequently.

Figure 2:
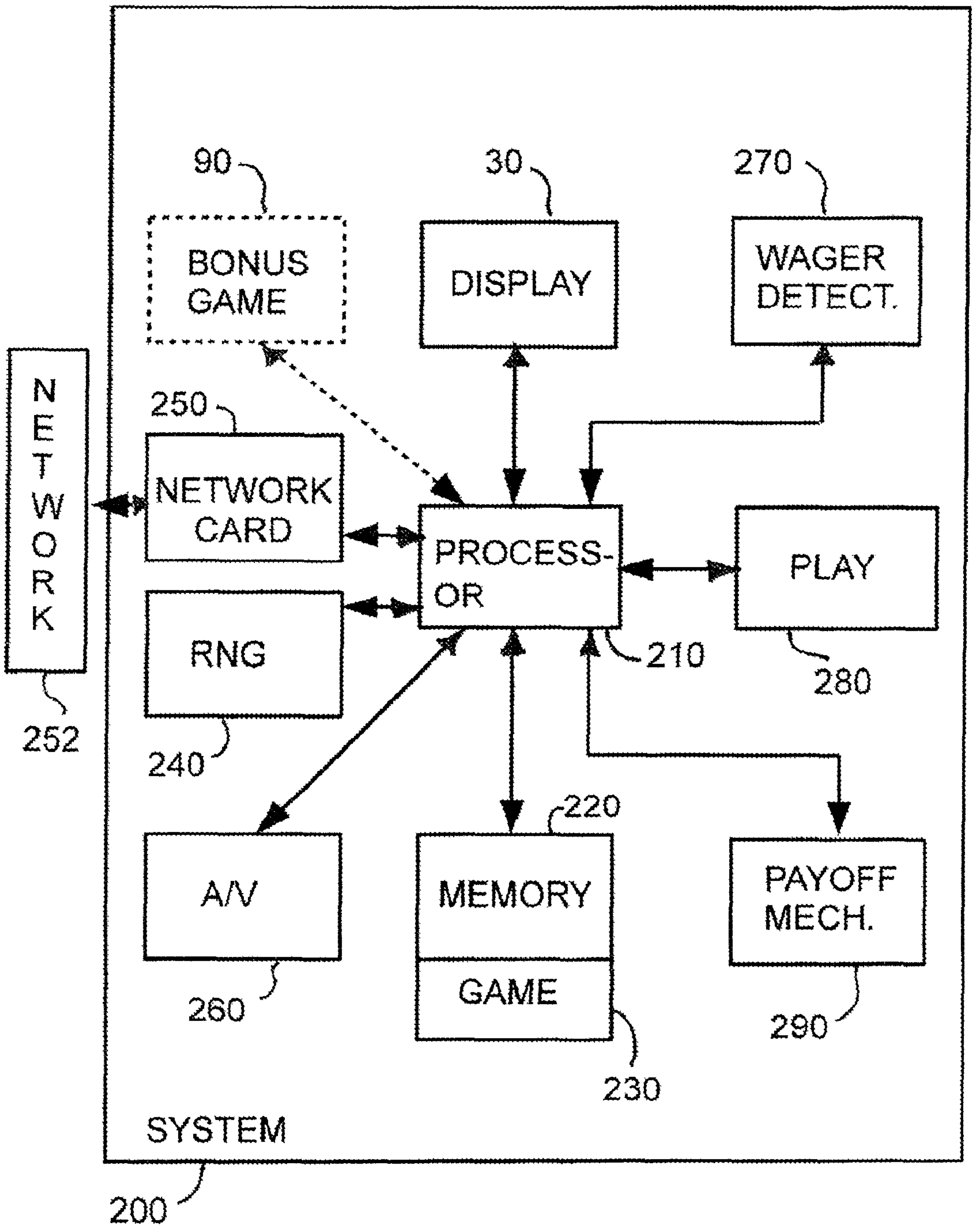
FIG. 2 is a block diagram of the system of the invention showing the components and the interconnection of the components.

The system components 200 are more functionally shown in the block diagram of FIG. 2. A processor 210 is shown which provides operational control. The processor 210 is conventional and may also be termed a micro-processor, a central processing unit (CPU), a controller, etc. The processor 210 connects to a system memory 220 (which contains the game software 230 of the invention) and to a random number generator (RNG) 240. The system memory 220 stores the operating software for the gaming machine 10 such as control instructions, any necessary data, inputs and outputs necessary for implementing game play according to the game software 230, etc. The system memory 220 is conventional and conventionally may use random access memory (RAM) and read only memory (ROM). The RNG 240 may be a separate component as shown and/or may be software within the memory 220. The processor 210 conventionally obtains a random number from the random number generator 240 in the play of the game 230 of the invention to provide a random game play result 120 which may, for example, be a winning outcome (a value award, a feature award, and item award, etc.) or a losing outcome (a no value or null award) according to a pay table. The processor 210 may also interface through a conventional network card 250 to a conventional network 252 such as a local area network (LAN), a wide area network (WAN), or over the Internet to a progressive gaming controller, a casino management network, a player's computer of appliance, etc. With respect to FIG. 1, the processor 210 connects with the touch screen display 30; the optional bonus game 90; a wager detection device 270 (e.g., ticket in 40, currency in 44, bet buttons 50, 52, and 54, credit display 80, bet display 82, etc.); play input device 280 (e.g., the max bet button 50, a play touch input on the screen 30, etc.); audio/visual outputs 260 (such as speakers 70, lights, etc.); and a payoff mechanism 290 (e.g., credit display 80; ticket out 42, cash out 60, paid display 84, etc.). The wager may be based on actual or play money. All of the system components (except the game software 230 of the invention) are conventionally available either individually or together from a number of different sources. Again, the various components shown are just one functional embodiment and many conventional design variations for gaming platforms are available to implement the game of the invention and its various embodiments and variations.

Figure 3:
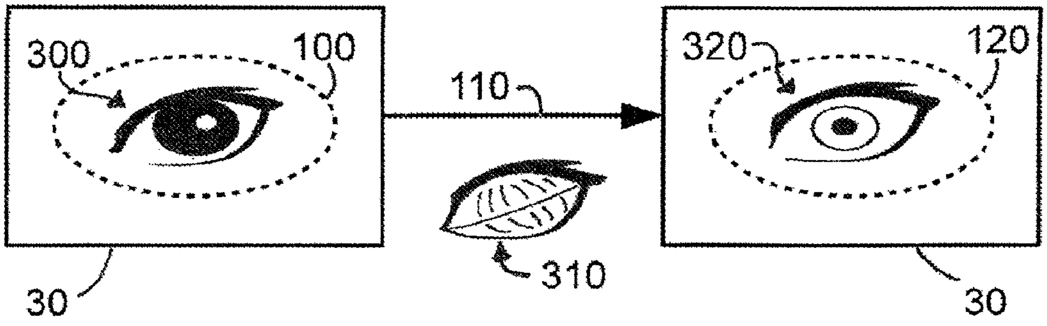
FIG. 3 is an example of the wagered-on only one game symbol of the invention revealing a random game play result.

The only one game symbol 100 for wagering on shown in FIG. 1 for game play can be any suitable symbol based on any suitable theme. Only one symbol 100 is wagered-on in the display and played in the base game of the invention. For example, FIG. 3 shows the wagered-on only one game symbol 100 representing an "eye" 300 in display 30. Any wagered-on only one game symbol 100 and theme can be utilized (and the invention is not limited to this example) such as a football, a rock, a car, an animal, a character, the moon, etc. In the preferred embodiment of the invention, only one game symbol is shown in the display. In another embodiment, a number of potential game symbols are first provided in the display 30 which allows the player to touch or otherwise select one and only one of the potential symbols to become the only one symbol for game play. Under either embodiment, the display provides only one game symbol for wagering-on by the player for game play.

The only one game symbol 100 for wagering-on can be visually represented in many different stationary or animated views before game play commences to encourage prospective players to sit and wager. When a player wagers, the processor 210 detects the wager in detector 270 and the wagered-on only one game symbol 100 is transformed, over a short time period 110, such as by animation (e.g., the transformed eye 300 winks 310 to reveal a random game play result 120 as shown by the blank eye 320. The game play result 120 may be one of a number of different types (or categories) of revealed game play results 120, each type of game play result having an associated random award which is also revealed. In FIG. 3, the blank eye 320 is a "value" type game play result 120 that has an associated null award and is a loss for the player. In a variation, the transformation 110 occurs when the player touches the eye 300 on touch screen to reveal the game play result (or, the player uses a finger to wipe away the eye 300 to reveal blank eye 320. The processor senses the player input and in response reveals the game play result 120.

In general, the game of the invention displays only one game symbol 100 in display 30 that can be wagered-on. In response to a wager, the processor 210 transforms the wagered-on one game symbol 100 in a short time period 110 to randomly reveal one specific game play result 120. The random game play result 120 can include many different symbol types such as: player action type, automatic selection type, bonus play type, value type, etc. The game play result 120, unlike multi-reel, multi-payline based games having various combinations of symbols, is only a single game play result 120.

Figure 4:
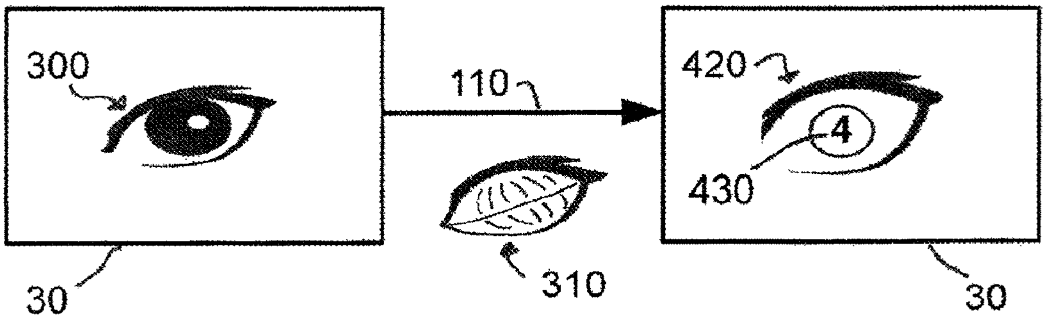
FIG. 4 is an example of the wagered-on only one game symbol of FIG. 3 revealing a value type random game play result showing an award.
Figure 5:
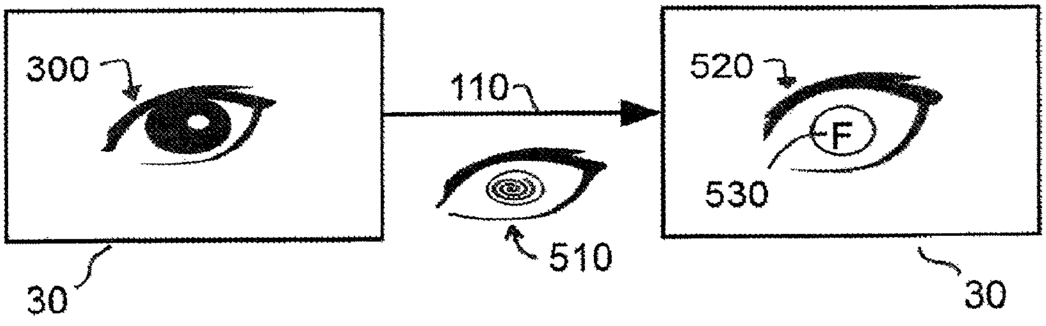
FIG. 5 is an example of the wagered-on only one game symbol of FIG. 3 revealing a value type random game play result showing a feature.

In the eye example, FIGS. 4, 5, 6 and 7 set forth three types of revealed game play results 120: value type, player action type, and automatic selection type. FIG. 4 illustrates a "value type" eye representation where the eye symbol 300 when transformed 110 in response to a game wager reveals a random game play result having a value type eye 420 with an award 430 of 4 credits. Any award 430 based on the game and pay table designs can be used. Awards 430 can include credits, multiples of wagers, items, free games, a null value, etc. The transformation 110 can be when the eye 300 animates under control of processor 210 to wink (one or a number of times) 310 and reveal the award 430 in the value type eye 420. In FIG. 5, when the eye symbol 300 is transformed 110, the eyeball spins hypnotically in the eye 510 during the time period 110 to reveal the value type eye symbol 520 having a free (F) game award 530 to play the next game. The transformation time period 110 can have any of a number of different visual animations based on the theme.

For the "eye" theme example, used throughout herein, "eye types" can be a sleepy eye, a blank eye, a weeping eye, a rolling eye, a wide eye, an exploding eye, etc. Each "eye type" can have an associated and different action along with an audio/visual announcement informing the player. A pay table on or associated with the gaming machine 10 explains the eye types and the associated awards to a player. By way of illustration, the "wide eye" type associates a player requested action which will be discussed with respect to FIGS. 6*a* and 6*b*. In another illustration, the "rolling eye" type can associate automatic game play to select a prize object as will be discussed with respect to FIGS. 7*a* and 7*b*. Whatever theme is selected, the wagered-on one game symbol 100 is transformed 110 over a time period to reveal a random "game play result" 120. The random game play result 120 is a "symbol type" having an "award" such as either an immediate award (as with the "value type" discussed above) or a subsequent award as discussed next.

Figure 6A:
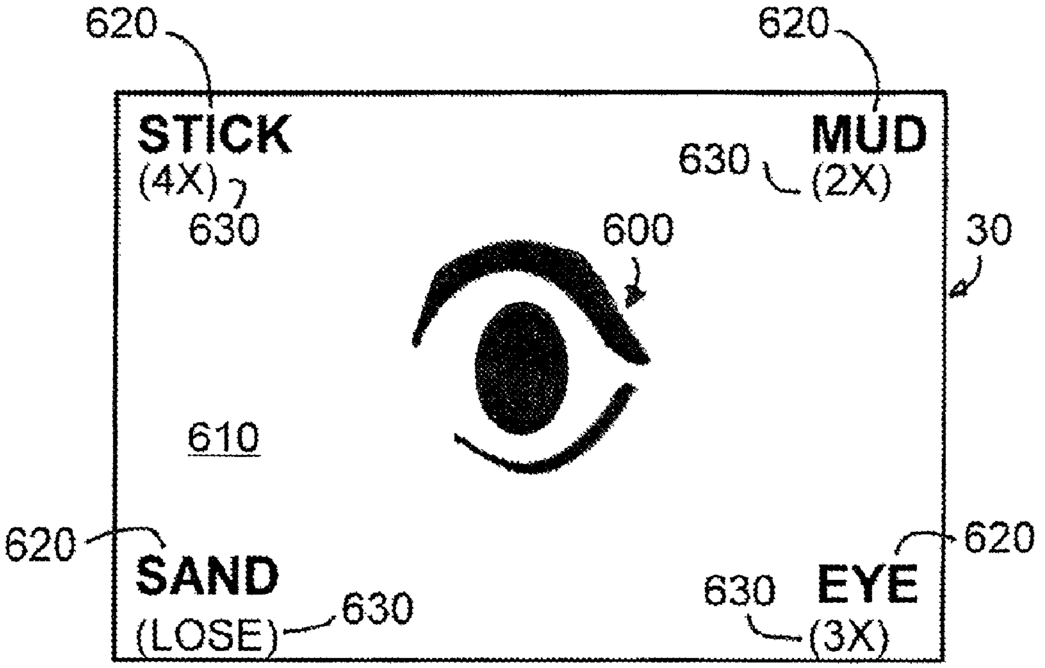
FIG. 6*a* is an example of the wagered-on only one game symbol of FIG. 3 revealing a player action type random game play result.
Figure 6B:
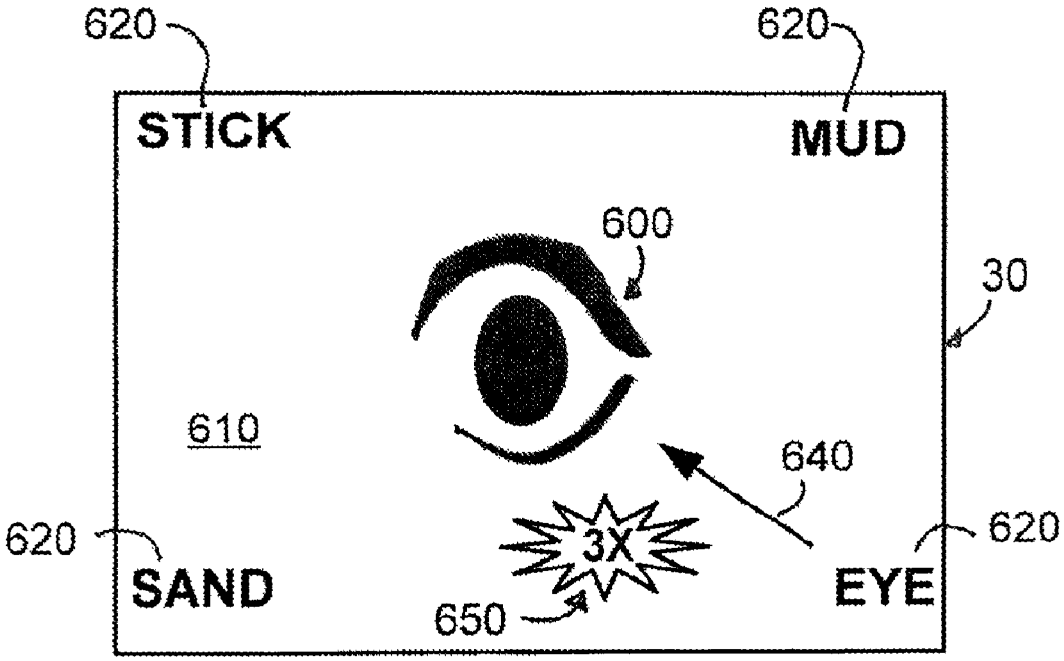
FIG. 6*b* is the example of a player picking one visual image of FIG. 6*a* to reveal an award.

FIGS. 6*a* and 6*b* show one variation of game play in response to a wager and requires player interaction on the touch screen 30. Here the wagered-on one game symbol 100 is illustrated as an eye 300 that after transformation 110 reveals a game play result 120 that is a "player action" type symbol 600 termed "wide eye" and is displayed on a field 610 in display 30 with a number of random visual images 620 for the player to pick. The randomly displayed visual images 620 may or may not be related to the game theme and the number and the content of each image 620 may randomly vary (or be constant) from game play to game play. Any number of visual images 620 can be used with the revealed "wide eye" 600 and a set of four visual images 620 each with an associated hidden award 630 (stick (4×), mud (2×), eye (3×), and sand (loss)) are illustrated. Each image 620, ties into the "eye" theme in this example: "an eye for an eye", "here's mud in your eye", "poke a stick in your eye", and "kick sand in your eye." The player is requested through speaker 70 by processor 210 to touch one visual image 620 and the touched image moves 640 into the wide eye 600 to reveal the associated random award 630. FIG. 6*b* shows that the player touched the image of an "eye" 620 which moves 640 (an eye for an eye) to wide eye 600 to reveal the randomly associated 3× award in a celebration 650 which awards the player 3 times the wager. The random game play result 120 is the player action type symbol 600 and the player selected the 3× award from among four random visual images 630. The credit meter 80 is increased by 3 times the wager. The invention is not limited to the representations shown as any grouping of visual stationary or animated images 620 can be used in the field 610 on screen 30 based on the theme chosen.

FIGS. 6*a* and 6*b* set forth a plurality of visual images 620 in the display 30 with the revealed symbol type 600 where each of the visual images 620 has an associated random award 630. The player provides an input in touch screen 30 selecting one of the visual images 620. The associated random award 630 is displayed in the display 30 and becomes the revealed award for the only one random game play result 120.

Figure 7A:
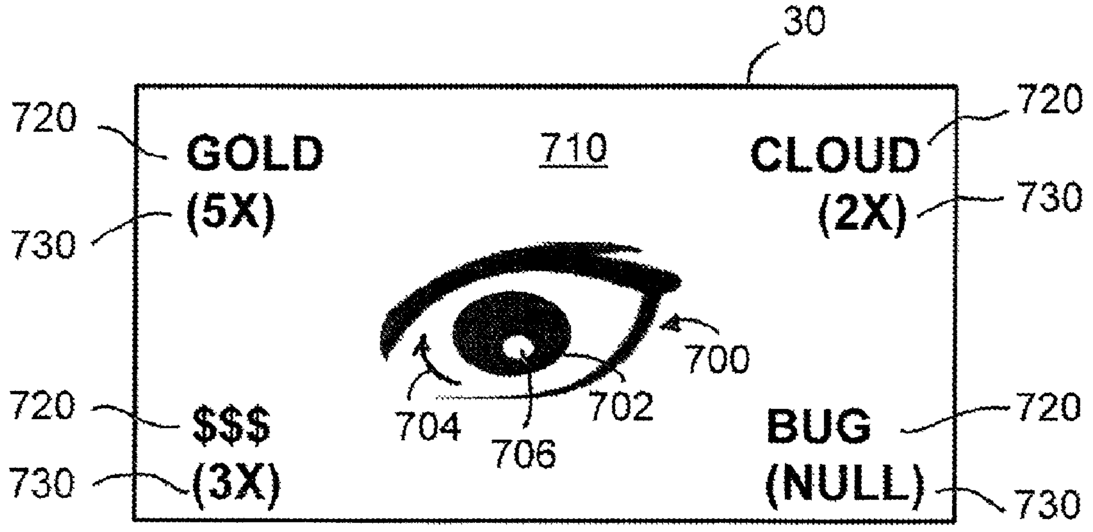
FIG. 7*a* is an example of the wagered-on only one game symbol in revealing an automatic selection type random game play result.
Figure 7B:
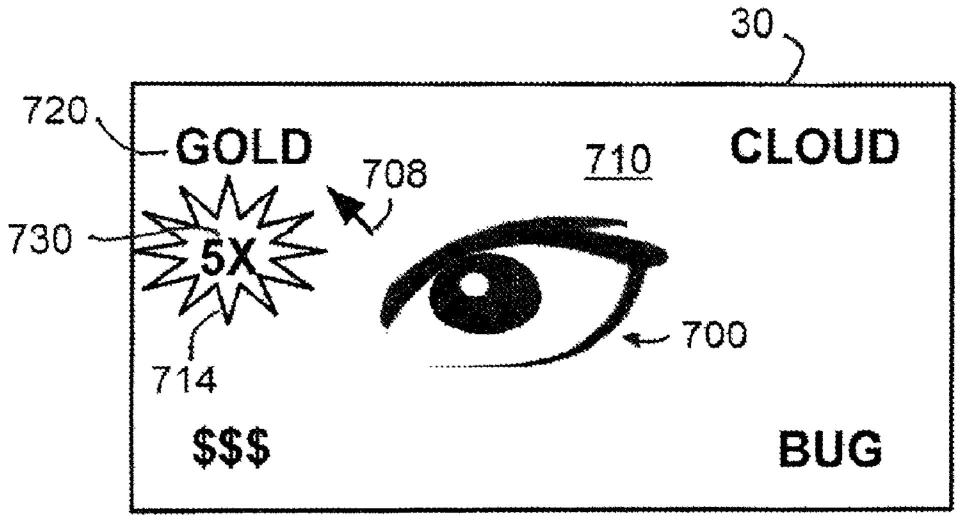
FIG. 7*b* is the example of the automatic selection by the game of one prize object of FIG. 7*a* to reveal an award.

FIGS. 7*a* and 7*b* show yet another variation of game play. Here, the wagered-on only one game symbol 100 is illustrated as eye 300 that is transformed 110 and to reveal a random automatic selection type symbol 700 such as a "rolling eye" in a field 710 of prize objects 720. The rolling eye symbol 700 automatically (under control of software 230) randomly selects one of a number of prize objects 720 in the field 710. The prize objects 720 may or may not be related to the game theme and the number and the content of each prize object may randomly vary from game play to game play. Any number of prize objects 720 can be used with the revealed "rolling eye" type symbol 700 and a set of four prize objects 720 each with an associated hidden random award (cloud (2×), bug (null), dollar sign (3×), and gold (5×)) are illustrated in FIG. 7*a*. In FIG. 7*a*, the eye ball 702 rolls in the direction of arrow 704. As it rolls 704, the pupil 706 looks 708 at each prize object 720 and the looked at object 720 becomes animated. The eyeball 702 can roll at any desired speed and can roll in a full circle any number of times before settling on one object 720. While rolling is one method of random selection, the eyeball 702 and pupil 706 can randomly look at prize objects in any direction without rolling. In FIG. 7*b*, the prize object 720 automatically and randomly selected 708 by the processor is the gold prize object 720 ("I see gold!") shown which is then animated in a win celebration 714 to reveal the associated hidden 5× award (5 times the amount wagered). The rolling 704 of the eye is accompanied with sound effects. The random game play result 120 is the automatic selection type symbol 700 selecting a 5× award from among four random awards. The credit meter 80 is increased by 5 times the wager.

In the above, for the "eye" wagered-on only one game symbol 300 may transform 110 into one of three different "types" of "eyes" as revealed game play results 120: a value type eye 320, 420, and 520; a player action type "wide eye" 600; and an automatic selection type "rolling eye" 700. The player action "wide eyes" 600 and the automatic selection type "rolling eyes" 700 are displayed in an accompanying field (610, 710) of images 620 and objects 710. In general, the game of the invention plays only one game symbol 100 to be wagered-on and, in response to a wager, transforms 110 the wagered-on symbol over a period of time to reveal the random game play result 120. The game play result 120 may cause further game play as the symbol type may be a "player action" type that requires the player to pick an image to receive an award or may be an "automatic selection" type where the process picks a prize object for the player to receive an award.

FIGS. 7*a* and 7*b* teach that, a plurality of prize objects 720 are displayed with the revealed symbol type 700 when the revealed symbol type 700 corresponds to an automatic selection type. Each of the plurality of prize objects 720 has an associated random award 730. The processor 270 randomly selects one of the prize objects 720 and displays the associated random award 730 in the display 30. In a variation of FIGS. 6*a*, 6*b*, 7*a* and 7*b*, one of the prize objects 270 selected (or visual images 620 touched) could result in the display of a new automatic selection type 700 or a player action type symbol 600 in a new field 710, 610 with new prize objects 720 or new images 620 to provide extended play in the game play result 120. This extended play in the game play result 120 may be accompanied by higher awards associated with the new prize objects 720 and new images 620 so as to provide player excitement. Any number of extended play iterations or rounds can occur. For example, the game play result 120 shows a wide eye 600 and the player selects an image 620 that reveals a rolling eye 720 (rather than an associated award 630). The new rolling eye 720, in extended play of the game play result 120, is displayed in a new field 710 of prize objects 720 and the rolling eye automatically selects a prize object which now reveals a wide eye symbol 600 and the player selects a new image 620. The extended play repeats any number of times until an associated value 630, 730 is finally revealed (which is usually a much higher award to provide player excitement.)

In summary of FIGS. 1 through 7, the gaming machine 10 of the invention at least includes: a processor 210; a display 30 connected to the processor 210; only one game symbol 100 that is wagered-on; a wager detector 270 connected to the processor 210; a wagering base game 230 in memory 220 controlled by the processor 210, the wagering base game using only one wagered-on game symbol 100 on the display 30 for game play; the only one wagered-on game symbol 100 being visually transformed by the processor 120 for a period of time during game play on the display 30 after the wager detector 270 detects a wager; the processor 210, at the end of the period of time, revealing on the display 30 in the wagering base game only one random game play result 120 for the wagered-on only one game symbol 100; a credit meter 80 connected to the processor 210; the processor 210 incrementing the credit meter 80 by an award in the revealed only one random game play result 120 when the revealed only one random game play result 120 provides the award other than a null award at the end of game play.

Figure 8:
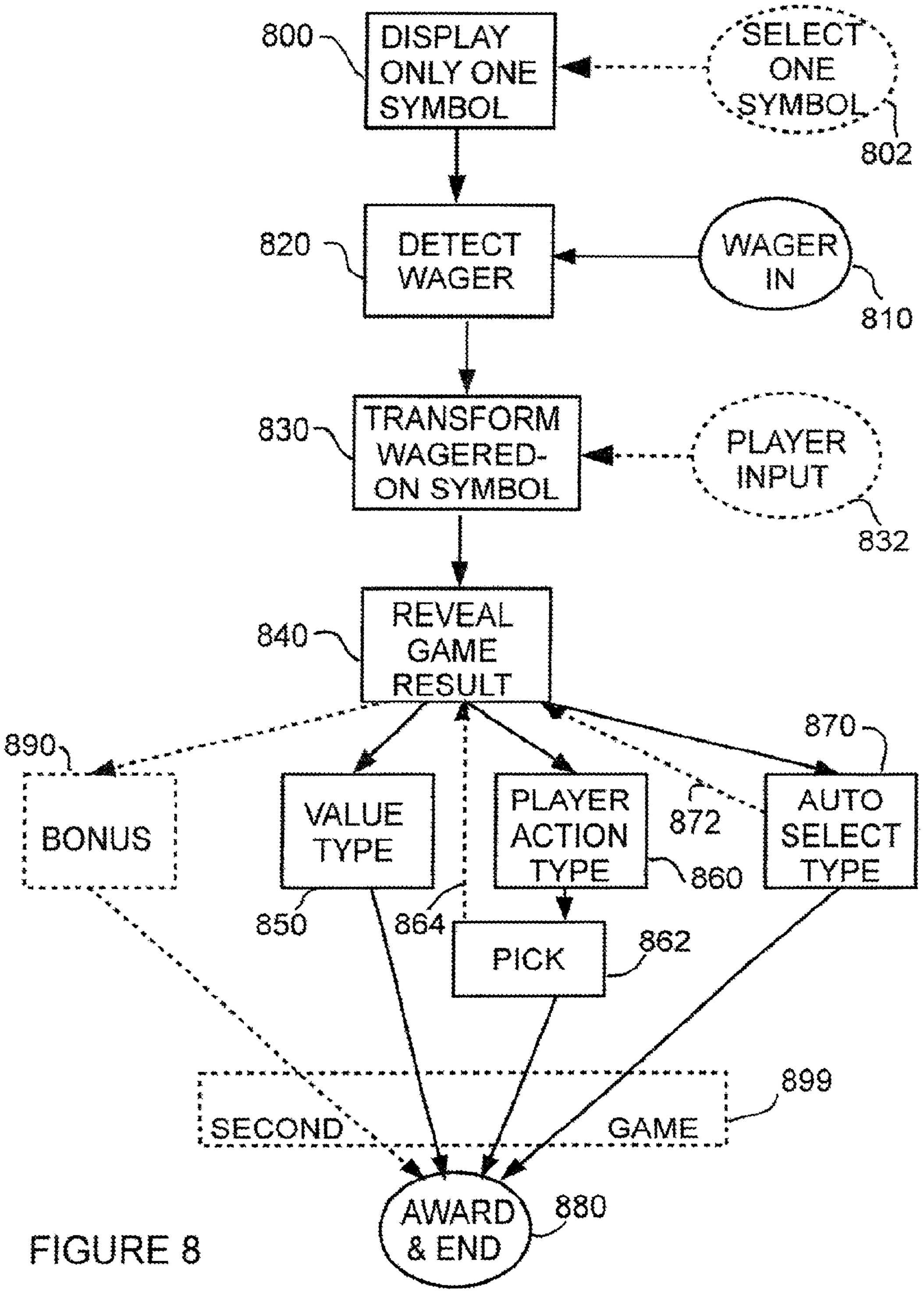
FIG. 8 is a functional flow chart showing the method of play for one embodiment of the invention.

In FIG. 8, the method of play for the invention is shown in one embodiment. The only one symbol 100 to be wagered-on is displayed 800 in the display 30 and can be in any of a number of different visual and animated representations to influence a player to wager. The player makes a wager 810 (e.g., presses a bet button 50, 52, 54, the play button 60, etc.) to commence game play. The processor 210 under control of software 220 detects 820 the wager and transforms 830 the symbol in the display 30 over a period of time. The period of time for transformation 110 in step 830 can be short such as two seconds or less or long such as five or more seconds. Any suitable time can be used.

In the other embodiment mentioned above, step 820 occurs first. In response to detecting a wager in step 820, a number of potential game symbols 100 are provided in the touch screen display 30 and in optional step 802, the player touches one symbol in the number as an input to the processor. The touched symbol becomes the "wagered-on only one" game symbol for game play in step 800. By way of illustration, display 30 could show three different potential symbols corresponding to three different types of themes such as: "eye", "cat" or "football." Any number of different potential symbols can be shown to the player on screen 30 for selection. The player selects the theme in optional step 802. The steps 800 and 820 can take place in any order as step 830 in any embodiment of the invention requires "only one wagered on symbol" for game play in step 830. An optional variation occurs in player input step 832 where the player performs the transformation 110 during game play by, for example, touching the wagered-on only one symbol on the screen 30 thereby causing step 840 to reveal.

The processor under control of software 220 using the RNG 240 then reveals 840 only one random game play result 120 in display 30. The only one random game play result 120 is determined using the random number generator and the statistics designed for the game of the invention. If the displayed game play result 120 is a value type symbol, then the value type symbol and the award is displayed in step 850 (see value type eye 420 in FIG. 4 having a four credit award). The processor 210 credits 880 the payoff mechanism 290 such as increasing the credits in the credit meter 80 and the game ends. An award could be zero or null in which case, no increase of the credit meter 80 occurs in step 880.

In summary, a method for playing a wagering base game using a processor in a player operated gaming machine 10 has been set forth in FIG. 8 having the steps of: displaying 800 in a display 30 of the player operated gaming machine 10 only one game symbol 100 for wagering on in the game play under control of the processor 210; detecting 820 a wager in the processor 210 of the player operated gaming machine 10 to commence game play of the only one game symbol 1001; transforming 830 the wagered-on only one game symbol 100 in the display for a period of time during game play, under control of the processor 210, in response to detecting the wager; revealing 840 only one random game play result 120 for the wagered-on only one game symbol 100 in the display 30 during the game play in response to transforming the only one game symbol; the only one revealed game play result 120 corresponding to a random one of a plurality of different game play results for the wagered-on only one game symbol selected by the processor 10 of the player operated gaming machine; and providing 880 a credit in the player operated gaming machine 10 under control of the processor 210 at the end of game play of the wagering base game when the revealed only one random game play result 120 for the wagered-on only one game symbol 100 is an award. The steps of 800 and 820 can occur in any order and, if optional step 802 is used, step 820 would occur prior to steps 800 and 802.

If the revealed only one random game play result 120 is a player action type, then the processor 210 displays the player action type symbol 120 in the display 30 along with a field of images and uses the audio/visual outputs 290 (which may include screen 30) to ask the player to perform an action by touching the screen 30. For example, in FIG. 6*a*, the processor 210 under control of software 220 displays 860 the wide eye action type symbol 600 along with a number of associated visual images 620 in a play field 610. The player picks 862 one visual image 620 by touching it which is detected by the processor 210 and the processor then displays in step 862 in screen 30 the action of the touched image 620 for the symbol 600. In the example of FIG. 6*b*, this is the movement 640 of the touched eye image 620 to the displayed eye image 600 ("we see eye to eye") resulting in an award 880 of 3×. The processor increases the credit meter 80 by three times the wager in step 880 and the game ends. When the touched visual image 620, in an optional variation of the invention for extended play of the game play result 120, reveals another symbol type such as a player action 600 or automatic selection 700 (or any other suitable symbol type based on the game design), then play of the game play result continues 864 in step 840.

If the displayed game play result 120 is an automatic selection type, then the processor 210 in step 870 displays a new screen in display 30 showing the auto-select type symbol selecting one prize object from a number of prize objects and then revealing an award. For example, in FIG. 7*a*, the screen displayed is shown and the rolling eye 700 views all prize objects 720 before automatically and randomly selecting one prize object 720 as shown in FIG. 7*b* to reveal an award of 5×. The processor increases the credit meter 80 by five times the wager in step 880 and game play ends. When the selected prize object 720, in an optional variation of the invention for extended play of the game play result 120, reveals another symbol type such as a player action 600 or automatic selection 700 (or any other suitable symbol type based on the game design), then play of the game play result continues 872 in step 840.

FIG. 8 also shows an optional bonus feature to the base game discussed above. When a bonus is revealed 890 in the game play result 120 of the base game an optional bonus game 90 is played in a conventional manner. Any bonus awards increase the credit meter 80.

Figure 9:
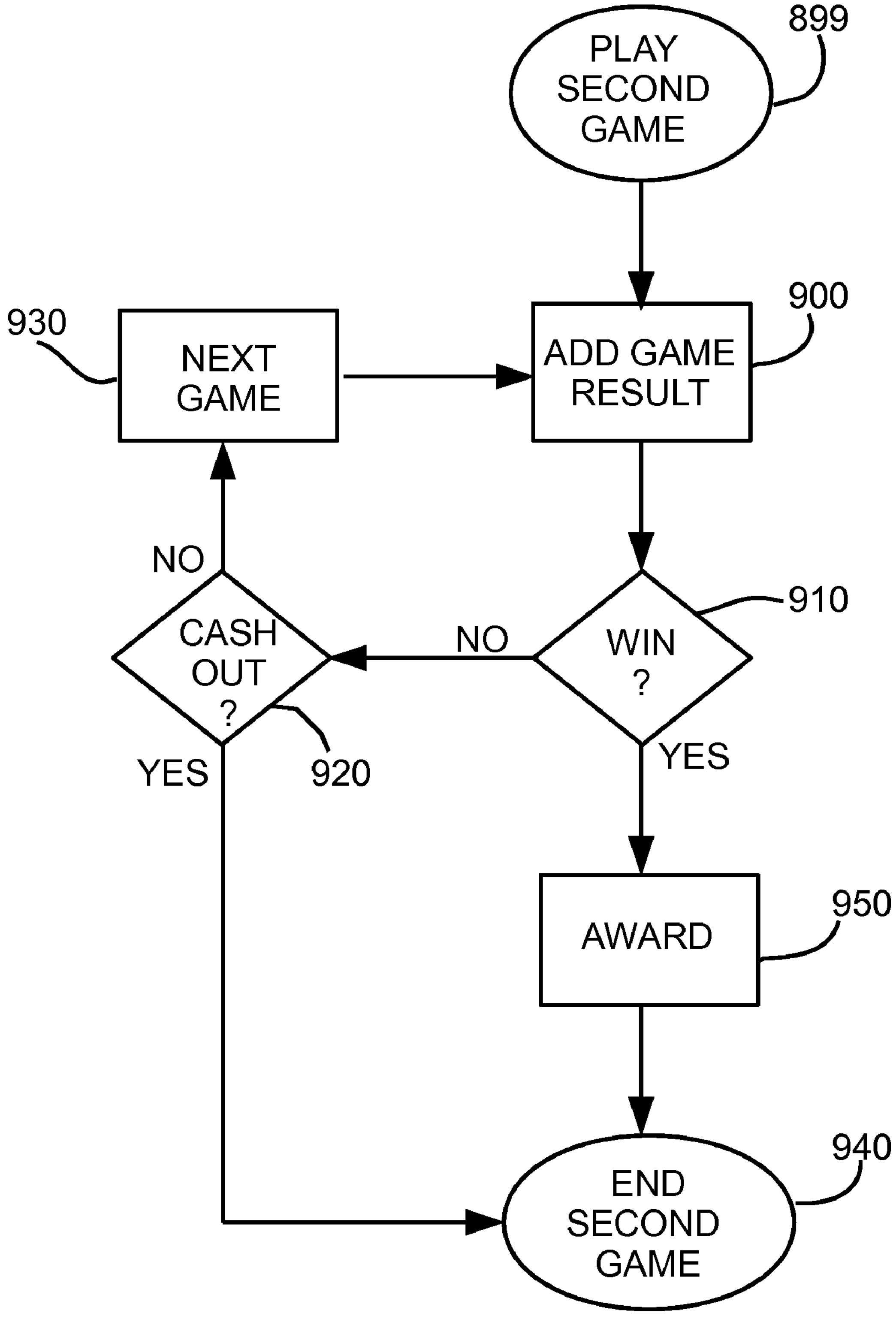
FIG. 9 is a functional flow chart showing the method of play for an optional second game of the invention.

FIG. 8 also provides optional play in step 899 as shown in FIG. 9. The processor 210 in step 899 displays a second game in display 30 and adds the game play result 120 obtained in step 840 to the second game in step 900 of the second game. If no win outcome occurs in step 910, then the processor 210 determines whether the player has cashed out in step 920 (the processor 210 receives a cash out signal from payoff mechanism 290), if not then the next FIG. 8 game 930 is played in step 820 in response to the next wager 810 from the player. In the next FIG. 8 game, a next game play result 120 is revealed in step 840 and this game play result 120 is added to the second game in step 900. This process continues as long as the player keeps wagering 810 and until the player cashes out in step 920 (by pushing the cash out button) in which event, the second game ends 940 and, of course, the game of FIG. 8 is over too. The second game encourages the player to stay and play the wagered-on one symbol of FIG. 8 until winning in the second game. When a win is detected 910 in the second game 899 by the processor 210 an award is made 950. The second game can be any game that uses the wagered-on one symbol or a portion thereof revealed in step 840 as a playing piece.

Figure 10:
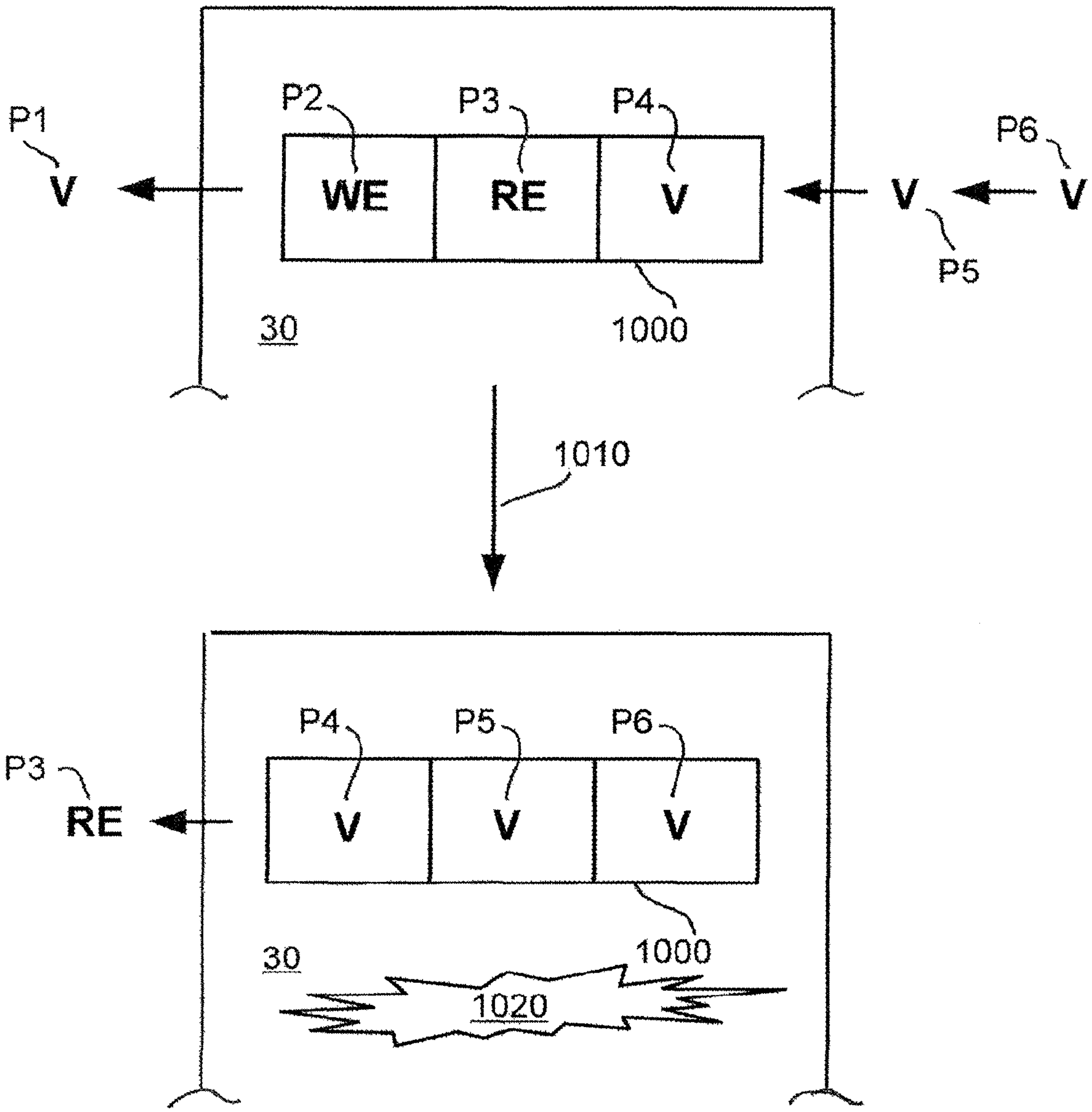
FIG. 10 is an illustration of a three of a kind second game played pursuant to the method of FIG. 9.

For example in FIG. 10, the second game 1000 is "Three of a Kind" and is displayed at the upper region of the display 30. With each play of the wagered-on one symbol 100, a game play result is revealed 110 in step 840. That revealed game play result 110 is a playing piece in the Three of a Kind game 1000. When the player sits down for the first time in the play of the FIG. 8 game and obtains the first game play result 110 that result becomes the first play piece P1 in the game 1000. After three successive plays of the FIG. 8 game, the second game 1000 has three pieces loaded in. Each new FIG. 8 game played results in a new game play result play piece entering the second game with the oldest game piece exiting from the game 1000. In FIG. 10, the exiting play piece P1 is from the first FIG. 8 game played, the second, third, fourth, fifth, and sixth successive FIG. 8 game plays result in play pieces P2, P3, P4, P5 and P6 that enter and leave the second game 1000.

Assume the player has played six FIG. 8 games in the second game of FIG. 10. Here, P1 is a value type (V) play piece; P2 is a wide eye type (WE) play piece; P3 is a rolling eye type (RE) play piece; P4 is a value type (V) play piece; P5 is a value type (V) play piece and P6 is a value type (V) play piece. As shown in FIG. 10 when play pieces P4, P5, and P6 are shown in the second game 1000 at time 1010 a winning three of a kind combination exists (V, V, V) and a win celebration 1020 occurs. In one embodiment, the type (i.e., value, wide eye, exploding eye, rolling eye, etc.) of play piece without any award is used (e.g., {wide eye, wide eye, wide eye}). In another embodiment the type and award are used and must all match (e.g., rolling eye (4), rolling eye (4), rolling eye (4)}). In another embodiment only the awards are used as play pieces without reference to "types" (e.g., {null, null, null}). The secondary game 899 encourages a player to stay seated and to keep on playing at that machine to earn additional winning combinations.

While a Three of a Kind secondary game 1000 is set forth in FIG. 10 any second game using playing pieces can be incorporated. Another second game example would be TIC TAC TOE. Any secondary game using play pieces based on the game play results 110 can be used. In another embodiment, the secondary game can only be activated when the player places a second or side wager to play the secondary game. Hence, in step 899, the processor 210 would make a determination as to whether the side wager has been placed. The side wager could be a single side wager made when the player plays the first FIG. 8 game or could be a side wager made when the player plays each FIG. 8 game.

In FIG. 1, a player can wager one, two or a max bet of three units such as $1 units. To simplify, the game even more, in a variation of the invention, only one bet is made such as one dollar. From a player's point of view, only one bet is ever made and only one wagered-on symbol is ever played. The game is easily understood by the player and the player may have the opportunity to interact with the game (first and in one embodiment to select a game theme symbol in step 802 to be the only one symbol for game play and second to reveal a game play result). The player's odds of winning are based completely on any conventional statistic design involving the casino pay off percentages, the number of different symbol types in the game play results, the number of different awards in each different symbol type, and the provision of bonus play.

As a simplistic illustration and based on having only a one dollar wager with no bonus play or second game, a 95% player payback is obtained in the following. Assume the following statistical odds over all time for 1000 game plays at $1 wager each for a player wager total of $1000: 510 game plays provide a null award ($0 total) or 51% of the time; 250 game plays provide a $1 award ($250 total) or 25% of the time; 100 game plays provide a $2 award ($200 total) or 10% of the time; 80 game plays provide a $3 award ($240 total) or 8% of the time; 40 game plays provide a $4 award ($160 total) or 4% of the time; and 20 plays provide a $5 award ($100 total) or 2% of the time. The value awards statistically total $950 over 1000 game plays (or 95% player return with a 5% casino pay off). The number of different awards can be further allocated to the different symbol types as follows in this example: value type (V) {510-null, 250-$1}; wide eye type (WE) {50-$2, 40-$3; 20-$4, 10-$5} and rolling eye type (RE) {50-$2, 40-$3; 20-$4, 10-$5}. In the foregoing, "10-$5" reads as 10 awards of $5 each provided in the RE type symbol result. This illustration provides an equal allocation of the four higher awards in the WE and RE game play result types. In this illustration, randomly, a value type game play result is selected 76% (510+250=760) of the time, a player action type game play result is selected 12% (50+40+20+10=120) of the time and an automatic selection type game play result is selected 12% (50+40+20+10=120) of the time. Any suitable statistical algorithms providing much higher value awards (but much less frequent) and more game play result symbol types with different distribution among symbol types can be used based on the actual game play design incorporated under the teachings of the present invention.

The following sets forth a method of extended base game play based on the above. Rather than using an object such as an eyeball (football, cat, etc.) as the only one game symbol wagered-on, the only one game symbol wagered-on is a character involved with a continuing theme throughout extended base game play.

For example and with reference to FIG. 8, the only one wagered-on game symbol 100 in touch screen display 30 is a character 100 named Sally and who is shown staring at a pink ground hog near a hole. A wager is detected 820 for the game symbol, the display 30 then shows Sally with fear in her eyes falling down the hole for a period of time during transformation 830 and then screen 30 shows a transformed Sally in a room 830 for the first round of base game play.

First Round—The random game play result 840 revealed in the first round may be any one of at least the following symbol types: (1) Sally in the room happily holding a value type symbol with a value award, (2) Sally in the room sadly shaking her head holding a value type symbol with a null award (and/or saying "You lose)", or (3) Sally in the room as a player action type symbol surrounded by a number of visual images 630 (a glass of water labeled "Drink Me", an orange scone labeled "Eat Me," a refrigerator labeled "Open Me", a cell phone labeled "Use Me", etc.). If a value type symbol is revealed in (1) or (2), base game play ends. If a player action type symbol is revealed in (3), the player touches one visual image 630 on the touch screen 30 which now shows Sally in a forest for the second round of base game play.

Second Round—The random game play result revealed in the second round may be any one of the following symbol types: (1) Sally in the forest excited and pointing to a value type symbol with a value award, (2) Sally in the forest crying and pointing to a value type symbol with a null award or (3) Sally in the forest as a player action type symbol near a number of visual images 630 such as: a blue bird labeled "Let's Fly Away", an apple labeled "Take a bite and disappear", a squirrel labeled "Follow me for fun", etc. Base game play extends in new rounds as long as a player action type symbol is revealed (path 860) in FIG. 8) so a player can touch (862) one of the visual images 630. Base game play always ends 880 when a value type symbol is revealed 850 in a round.

Based on the mathematics of the game design; statistically a number of successive rounds of revealing player action type symbols in game play results 860 could occur. As the revealed value type symbol can randomly occur in any round (and therefore ends base game play), a player does not expect a predetermined number of extended rounds to occur; nor does a player expect to keep on receiving more than one revealed value type symbol in extended play of the base game. Stated another way, the extended base game play does not have a guaranteed number of rounds for the detected wager as base game play randomly ends when a revealed value type symbol occurs in any round.

There are several ways to provide for more extended base game play. First, a bonus game need not be provided so as to provide more funding for extended play in the base game. Second, the statistics of random selection for the revealed game play result could concentrate on randomly providing more player action type symbols in each of the early rounds and randomly providing less in later rounds. To illustrate this: assume the first revealed game play result 840 in round one provides the player an 80% chance of receiving a revealed player action type symbol 862; the second revealed game play result 840 has a 60% chance of the player receiving a player action type symbol 862; the third revealed game play result has a 40% chance, . . . etc. Any mathematical statistic selection pattern can be used to enable a player to statistically play more rounds in response to the detected wager. The following three pattern examples are shown for at least six rounds of base game play:

Pattern (1): {80%, 60%, 40%, 40%, 30%, 30%, etc.};
Pattern (2): {90%, 90%, 70%, 50%, 30%, 20%, etc.}; . . .
Pattern (n): {50%, 20%, 100%, 100%, 40%, 10%, etc.}.

In Pattern (1), a player has an 80% chance of receiving a player action type symbol revealed in the first round, a 60% chance of receiving a player action symbol in round two, etc. In Pattern (1), a player has about an 8% (0.8×0.6×0.4×0.4) chance of entering the fifth successive round. In Pattern (2), about 28% (0.9×0.9×0.7×0.5) of players play through to the fifth successive round. In Pattern (n), 4% (0.5×0.2×1×1×0.4) of players play through to the sixth round. While six rounds are shown, any suitable number can be used based on the overall statistical design of the base game's operation and return. Also, any suitable number of patterns with any variety of percentages can be mathematically provided under the overall statistical design of the base game's operation and return. In one embodiment of the invention, each pattern is randomly selected by the processor during base game play from a number of different patterns stored in a database in memory for play of one base game. In the next play of the base game, another pattern is randomly selected so as to provide excitement and unpredictability in separate base game plays.

Patterns (1) and (2) generally provides a pattern of probabilities for the processor to reveal player action type symbols in the early rounds of base game play so that statistically a player moves through successive rounds. Pattern (2) is like Pattern (1) but with higher probabilities at the beginning rounds. Pattern (n) initially has lower probabilities the first two rounds, but suddenly in rounds 3 and 4, the player is surprised as only player action type symbols are revealed. Pattern (n) provides an example of at least one high probability (such as 100%) in at least one of the rounds of base game play. The invention as set forth above statistically provides a player with extended play for a number of rounds without further wagering. The statistical length of base game play time is also controlled by a pattern's set of probabilities for revealing player action type symbols for extended play. In Pattern (1) about 8% of players reach the fifth round, whereas in Pattern (2) about 28% reach the fifth round. Base game play time based on Pattern (2) is statistically longer than Pattern (1).

In the above extended base game play examples of the invention, players statistically move through base game play rounds without having any value type symbols (either a value award or a null award) revealed. Players only have play satisfaction accompanied by visual and sound effects as they move through successive rounds. Any value type symbol 850 (null or value) revealed in a round ends base game play 880.

Value type symbols, revealed in any round, can also be mathematically designed to provide overall benefit to the player and to the house. Using the three patterns above as an example, the award symbol type probabilities (i.e., 100% minus the probability of receiving a player action type symbol) are illustrated for a wager of 3 units (max bet):

Pattern (1): {80% (20%-0.5 units), 60% (40%-1 unit), 40% (60%-1.5 units), 40% (60%-2 units), 30% (70%-3 units), 30% (70%-4 units), etc.};

Pattern (2): {90% (10%-0.3 units), 90% (10%-0.8 units), 70% (30%-2 units), 50% (50%-2 units), 30% (70%-3 units), 20% (80%-4 units), etc.}; . . .

Pattern (n): {50% (50%-0.5 units), 20% (80%-1 unit), 100% (0%-0 units), 100% (0%-0 units), 40% (60%-4 units), 10% (90%-5 units), etc.}.

In the example of Pattern (1), for the first round, the player has an 80% chance of extended game play 864 and a 20% chance of an award with an expected player payoff of 0.5 units. In the second round for Pattern (1), the player has a 60% chance of extended play and a 40% chance of an award with an expected player payoff of 1 unit. For the fifth round of Pattern (1), the player has a 30% chance of extended play and a 70% chance of an award with an expected player payoff of 3 units (which corresponds to the max wager). As mentioned earlier a player has an 8% chance of entering the fifth round in Pattern (1) but this player has a higher chance of an award symbol type with a higher expected payoff of 3 units than any earlier round of base game play. As shown above for the three patterns, the player expected payoff can vary for each round in each pattern based on the mathematical design of the game and the overall return to the player in play of the base game over all time. As a different pattern is randomly selected for play of each base game in response to the wager, the player encounters different base game probabilities throughout different base game plays.

In summary of the above, a method of playing a base game in a player operated gaming machine is set forth wherein only one game symbol is displayed for playing by a player in the base game without displaying in the display any of a plurality of symbol types associated with the random game play results of the base game. A wager for the only one game symbol in the display is detected to commence play of the base game. The wagered-on game symbol is then transformed from a first visual appearance in the display, under control of the processor, to a second different visual appearance in the display to reveal one random game play result. The one random game play result is selected by the processor during play of the base game from the plurality of symbol types that includes at least a value type symbol having a value, an value type symbol being null, and a player action type symbol. Play of the base game is extended when the player action type symbol is revealed in the display as follows: (1) a plurality of visual images are displayed in the display; (2) a player input is received in the processor selecting one of the plurality of displayed visual images; (3) a hidden symbol type randomly selected by the processor during play of the base game from the plurality of symbol types is revealed; and (4) repeating steps (1) through (3) for another round of base game play when the revealed hidden symbol type is another player action type symbol. Play of the base game ends when the value type symbol having a value or the value type symbol being null is revealed in the display at any time. Finally, a credit issues to the player in the gaming machine, under control of the processor, corresponding to the value of the revealed award symbol type.

A player expected payoff of 0.5 units in the first round of play of Pattern (1) above can also be mathematically designed based on a number of different random award tables such as, for example, Value type symbol Table 1: {1%-8 units, 1%-6 units, 2%-3 units, 2%-2 units, 26%-1 unit, and 68%-null}. The first round in the example of Pattern (1) is to provide a player an 80% probability of advancing into the second round or a 20% chance of receiving an award symbol type 850 in the first round with an expected return of 0.5 units. Those 20% of players, in Table 1, have a 1% chance of winning 8 units, a 1% chance of winning 6 units, a 2% chance of winning 3 units, a 2% chance of winning 2 units, a 26% chance of winning 1 unit and a 68% chance of losing (null award) for an expected player payoff in the first round of 0.5 units. Stated another way, a player in the first round of Pattern (1) with Table 1 has an overall probability of: 0.2% (20%×1%) to receive 8 credits, 13.6% (20%×68%) of losing, etc. All of the above is a simplistic set of statistics, not mathematically designed for real casino world use, but simply to illustrate the invention and the large number of patterns and award tables that can be designed for a base game as a whole based on the invention to provide an overall player expected return and length of play time at the base game.

Statistically, based on the base game design, and in one embodiment a player could expect to play successive rounds of extended play such as 2 to 4. The longer extended play occurs the higher the probability of winning an award with a higher value. In one embodiment, lower player expected payoffs (less than the wager) occur in the early rounds of extended base game play (such as rounds 2 to 4 of Pattern (1)). Even so, in the early rounds, a player statistically may receive an award value type greater than the wager such as those 0.2% of players in round one above that receive 8 credits. In another embodiment, higher expected payoffs (greater than the wager) occurs in later rounds of extended base game play (such as rounds 6 and beyond tin Pattern (1)). Even so, in the later rounds, a player statistically may receive an award null type that is a not a win.

A player never gets bored with the base game play of the invention as being repetitive as the revealed game play results (and, therefore the branches in the theme/story/game line) can be numerous and vigorous. By way of example, in the original 1865 book "Alice's Adventures in Wonderland" by Lewis Carroll there are 12 chapters (or scenes) and each chapter has sub-scenes. Using the chapters alone: a player wagering could be randomly presented with numerous scenes in any order (without repeating an earlier scene in an earlier round). For example, the processor could randomly select scenes base on the 12 chapters from a database in memory as follows: Wager 1: {1, 4, 8, 2, 7 . . . }; Wager 2 {5, 3, 8, 11 . . . }; Wager 3 {2, 6, 9, 12, . . . }; etc. For example, Wager 1 the processor randomly picks a scene based on chapter 1 (round 1), a scene based on chapter 4 (round 2), etc. Suitable graphics and sounds could be provided as a transition from round to round or the screen could just immediately change to the new round display. The graphic scene for each different base game is randomly selected from the database in memory so a player is not bored and entertained in each round of a given base game played in response to the wager. Using 12 chapters for 12 rounds of base game extended play, in one embodiment, the twelfth round in the Patterns (1), (2) . . . (n) would contain no player action type symbols only value type symbols having values higher than the value of the wager. In this embodiment, a player reaching the twelfth round (statistically very remote) receives a value award which would be, in all cases, much higher than the value of the wager causing play of the base game to end. To provide unpredictability to using a known amount of rounds (12 chapters), a further randomness could occur as follows: the processor after reaching a given round (e.g., the $9^{th}$ round) randomly selects which remaining round (10, 11, or 12) will contain only the high valued award type symbols.

All of the above assumes a player will promptly pick one of the visual images 620 displayed in a round. To prevent a player from taking too much time, each screen display for each round in step 862 could have a countdown clock audibly/visually informing the player that when time counts down to zero after a set time, a visual image 620 will be picked automatically (that is, the processor will randomly pick) as fully discussed above.

The goal is to give players an interactive game play experience which (1) provides extended play, (2) is vigorous in its selection of stories or themes, (3) is graphically presented in 2D or even 3D video than found in a typical reel based slot game.

The above disclosure sets forth a basic embodiment of the invention described in detail with respect to the accompanying drawings with a number of variations discussed.

Certain precise values have been utilized in the specification to illustrate the invention. However, these values do not limit the scope of the claimed invention and thus variations can occur.

It is noted that the terms "preferable" and "preferably," are given their common definitions and are not utilized herein to limit the scope of the claimed disclosure. Rather, these terms are intended to highlight alternative or additional features that may or may not be utilized in a particular embodiment of the present disclosure.

For the purposes of describing and defining the present disclosure it is noted that the term "substantially" is given its common definition and it is utilized herein to represent the inherent degree of uncertainty that may be attributed to any shape or other representation.

Those skilled in this art will appreciate that various changes, modifications, and other embodiments could be practiced under the teachings of the invention without departing from the scope of this invention as set forth in the following claims.

I claim:

1. A method of playing a base game in a player operated gaming machine comprising the steps of:

displaying in a display of the player operated gaming machine only one game symbol for wagering-on in playing the base game under control of a processor for the player operated gaming machine without displaying in the display any of a plurality of symbol types associated with random game play results of the only one game symbol;

detecting a wager for the only one game symbol displayed in the processor of the player operated gaming machine;

transforming the wagered-on only one game symbol in the display from a first visual appearance, during play of the base game and under control of the processor, to a second different visual appearance in the display in response to detecting the wager;

revealing only one random game play result in the second different visual appearance for the wagered-on only one game symbol in the display in response to the step of transforming; the revealed only one game play result randomly picked by the processor during play of the base game from the plurality of symbol types; the plurality of symbol types at least including a value type symbol having a value, a value type symbol being null and a player action type symbol;

extending play of the base game when the player action type symbol is revealed in the display comprising the steps of;

(1) displaying a plurality of visual images in the display;

(2) receiving a player input, in the processor, selecting one of the plurality of visual images in response to displaying the plurality of visual images;

(3) revealing in the display another game play result randomly picked by the processor during play of the base game from the plurality of symbol types in response to the received player input for the selected visual image;

(4) repeating the aforesaid steps of (1) displaying, (2) receiving, and (3) revealing in another round of base game play when the aforesaid revealed game play result is another player action type symbol;

ending play of the base game when the value type symbol having a value or the value type symbol being null is revealed in the display; and providing a credit in the player operated gaming machine, under control of the processor, corresponding to the value of the revealed value type symbol in response to ending play of the base game.

2. The method of claim 1 further comprising the step of:

providing a pattern of player action type symbol higher probabilities for a revealed game play result to more frequently reveal a player action type symbol in early rounds of base game play so as to statistically extend play of the base game until the step of ending play occurs.

3. The method of claim 2 further comprising the step of:

providing in the pattern of player action type symbol probabilities lower player expected payoffs for the value type symbols in the revealed game play result in the early rounds of extended base game play, the lower player expected payoffs less than the wager.

4. The method of claim 2 further comprising the step of:

providing in the pattern of player action type symbol probabilities higher player expected payoffs for the value type symbols in the revealed game play results in the later rounds of extended base game play, the higher player expected payoffs greater than the wager.

5. The method of claim 1 further comprising the step of:

providing a pattern of player action type symbol probabilities for the player to always receive in at least one round of extended base game play a player action type symbol as the game play result so as to always continue play of the base game in the aforesaid at least one round for the wagered-on one game.

6. The method of claim 1 wherein the step of receiving a player input further comprises the step of:

displaying a countdown sequence starting in the display with the displayed plurality of images visual images, and randomly selecting one of the displayed visual images under processor control when the countdown sequence counts down to zero.

7. The method of claim 1 wherein the step of repeating comprises:

ending base game play by providing in the last base game play round only random value type symbols as revealed game play results.

8. A method of playing a base game in a gaming machine comprising the steps of:

displaying in a display of the gaming machine only one game symbol for wagering-on in playing the base game under control of a processor;

detecting a wager for the only one game symbol displayed in the processor;

transforming the only one game symbol in the display from a first visual appearance, during play of the base game and under control of the processor, to a second different visual appearance in the display in response to detecting the wager;

revealing only one random game play result in the second different visual appearance for the only one game symbol in the display in response to the step of transforming; the revealed only one random game play result picked by the processor during play of the base game from a plurality of symbol types; the plurality of symbol types at least including a value type symbol and a player action type symbol;

extending play of the base game when the player action type symbol is revealed in the display comprising the further steps of:

(1) displaying a plurality of visual images in the display;

(2) receiving a player input from the player, in the processor, selecting one of the plurality of visual images in response to displaying the plurality of visual images;

(3) selecting one of the displayed visual images under processor control when a player input is not received within a set time after displaying the plurality of visual images;

(4) revealing in the display another game play result randomly picked by the processor during play of the base game from the plurality of symbol types in response to the selected visual image by the player or by the processor;

(5) repeating the aforesaid steps of (1) displaying, (2) receiving, (3) selecting and (4) revealing in another round of base game play when the aforesaid revealed symbol type is another player action type symbol;

ending play of the base game when the value type symbol is revealed in the display; and providing a credit in the player operated gaming machine, under control of the processor, corresponding to the value of the revealed value type symbol in response to ending play of the base game.

9. The method of claim 8 further comprising the step of:

providing a pattern of player action type symbol higher probabilities for a revealed game play result to more frequently reveal a player action type symbol in early rounds of base game play so as to statistically extend play of the base game until the step of ending play occurs.

10. The method of claim 9 further comprising the step of:

providing in the pattern of player action type symbol probabilities lower player expected payoffs for the value type symbols in the revealed game play result in the early rounds of extended base game play, the lower player expected payoffs less than the wager.

11. The method of claim 9 further comprising the step of:

providing in the pattern of player action type symbol probabilities higher player expected payoffs for the value type symbols in the revealed game play results in the later rounds of extended base game play, the higher player expected payoffs greater than the wager.

12. The method of claim 8 further comprising the step of:

providing a pattern of player action type symbol probabilities for the player to always receive in at least one round of extended base game play a player action type symbol as the game play result so as to always continue play of the base game in the at least one round for the wagered-on one game.

13. The method of claim 8 wherein the step of repeating comprises:

ending base game play by providing in the last base game play round only random value type symbols as revealed game play results.

14. A method of playing a base game in a gaming machine comprising the steps of:

detecting a wager in a processor of the gaming machine;

revealing one game play result in a display in play of the base game in response to the detected wager; the revealed one game play result randomly picked by the processor during play of the base game from a plurality of symbol types; the plurality of symbol types at least including a value type symbol and a player action type symbol;

extending play of the base game when the player action type symbol is revealed as the game play result in the display comprising the further steps of:

(1) displaying a plurality of visual images in the display;

(2) receiving a player input from the player, in the processor, selecting one of the plurality of visual images in response to displaying the plurality of visual images;

(3) revealing in the display another game play result randomly picked by the processor during play of the base game from the plurality of symbol types in response to the selected visual image by the player or by the processor (4) repeating the aforesaid steps of (1) displaying, (2) receiving, and (3) revealing in another round of base game play when the aforesaid revealed symbol type is another player action type symbol;

ending play of the base game when the value type symbol is revealed in the display;

providing a pattern of player action type symbol higher probabilities for a revealed game play result in a memory of the gaming machine for the processor to more frequently randomly reveal a player action type symbol in early rounds of base game play so as to statistically extend play of the base game until the step of ending play occurs; and providing a credit in the player operated gaming machine, under control of the processor, corresponding to the value of the revealed value type symbol in response to ending play of the base game.

15. The method of claim 14 further comprising the step of:

providing in the pattern of player action type symbol probabilities higher player expected payoffs for the value type symbols in the revealed game play results in the later rounds of extended base game play, the higher player expected payoffs greater than the wager.

16. The method of claim 14 further comprising the step of:

providing a pattern of player action type symbol probabilities for the player to always receive in at least one round of extended base game play a player action type symbol as the game play result so as to always continue play of the base game in the at least one round for the wagered-on one game.

17. The method of claim 14 wherein the step of repeating comprises:

ending base game play by providing in the last base game play round only random value type symbols as revealed game play results.

* * * * *